Figure 1:
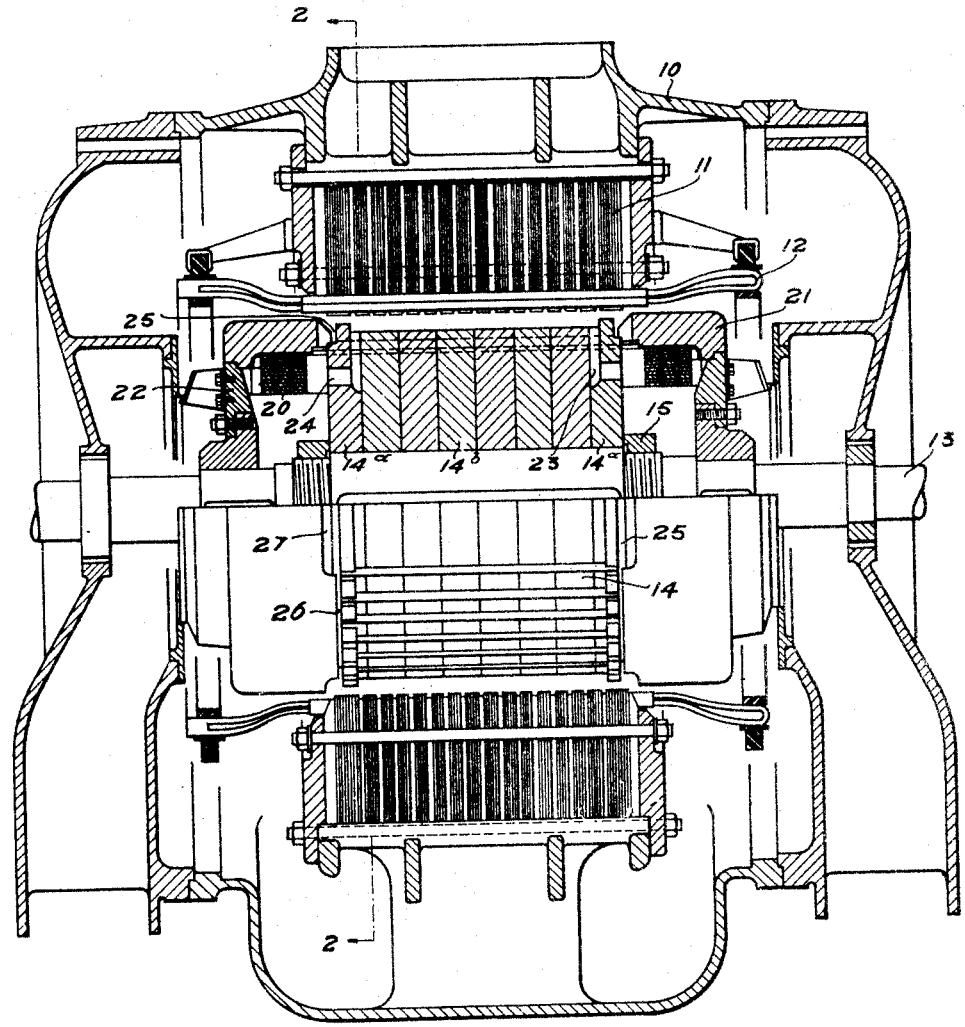

C. J. FECHHEIMER.
DYNAMO ELECTRIC MACHINE.
APPLICATION FILED MAY 13, 1909.

982,806.

Patented Jan. 31, 1911.
2 SHEETS—SHEET 1.

C. J. FECHHEIMER.
DYNAMO ELECTRIC MACHINE.
APPLICATION FILED MAY 13, 1909.

982,806.

Patented Jan. 31, 1911.

2 SHEETS—SHEET 2.

Witnesses
Rob. E. Holl
Chas. L. Byron

Inventor
Carl J. Fechheimer
By Chas. E. Lord
Attorney

UNITED STATES PATENT OFFICE.

CARL J. FECHHEIMER, OF MILWAUKEE, WISCONSIN, ASSIGNOR TO ALLIS-CHALMERS COMPANY, A CORPORATION OF NEW JERSEY.

DYNAMO-ELECTRIC MACHINE.

982,806. Specification of Letters Patent. Patented Jan. 31, 1911.

Application filed May 13, 1909. Serial No. 495,761.

*To all whom it may concern:*

Be it known that I, CARL J. FECHHEIMER, a citizen of the United States, residing at Milwaukee, in the county of Milwaukee and State of Wisconsin, have invented certain new and useful Improvements in Dynamo-Electric Machines, of which the following is a full, clear, and exact specification.

This invention relates to dynamo-electric machines and particularly to high speed machines such as turbo-alternators having rotating field magnets.

In dynamo-electric machines and particularly in high speed machines having rotating elements provided at the ends with rings or equivalent means for retaining in position the end portions of the coils, there is a leakage of the field flux at the ends of the machine and particularly through the coil retaining means. This magnetic leakage is undesirable for several reasons among which is, it necessitates more field ampere-turns and consequently a greater weight of copper and a larger core cross section for a certain voltage, load and power factor, than would be required if all the flux passed across the air gap between the cores of the rotating and stationary elements. Furthermore this magnetic leakage is undesirable particularly in machines of certain types and designs, for the reason that it causes an unequal distribution of flux axially, the flux density being greater at the middle of the machine than at the ends. This unequal distribution of flux is more marked in some machines than others, being greater in those machines having rotating field magnets provided at intervals with air gaps, for the reason that the air gaps increase the reluctances of the magnetic paths axially through the rotor core, and therefore prevent an equalization of the flux density. This unequal distribution of flux causes the core losses and the heating incident thereto to be greater at the middle of the machine than at the ends.

The object of the invention is to so construct dynamo-electric machines that this magnetic leakage will be greatly decreased, and a practically uniform flux density obtained.

In carrying out my invention I so construct the machine and preferably the rotor or rotary element thereof that when the machine is in operation, the end portions of the rotor core are highly saturated and are worked at a higher flux density than the intermediate portions. At the same time I cause the gap or clearance between the end portions of the rotor core and the corresponding portions of the stator core to be less than the clearance at the middle of the machine, so that the reluctance of the air gap will be less at the ends of the machine than intermediate the ends, and I also increase the reluctances of the magnetic paths from pole to pole through the retaining means for the end or projecting portions of the coils carried by the rotor. In the preferred form of my invention the air gap or clearance is varied by making the diameter of the rotor core greater at the ends than between the ends, thereby causing the density of the flux passing between the end portions of the cores of the rotary and stationary members to be greater than it would be if the diameter of the core of the rotary member were uniform. The diameter and cross sectional areas of the end portions of the rotor core, which portions are preferably separated from the intermediate portions of the core by gaps or spaces of high reluctance, are such that the density of the flux passing between the cores of the rotary and stationary elements is practically uniform from one end of the machine to the other, and at the same time these end portions of the rotary core are highly saturated. This construction, together with the fact that the reluctances of the magnetic paths from pole to pole through the coil retaining means at the end of the core are made very high, reduces the magnetic leakage to a minimum.

My invention may be further briefly summarized as consisting in certain novel details of construction and combinations of parts which will be described in the specification and set forth in the appended claims.

Reference is had to the accompanying sheets of drawings in which—

Figure 2:
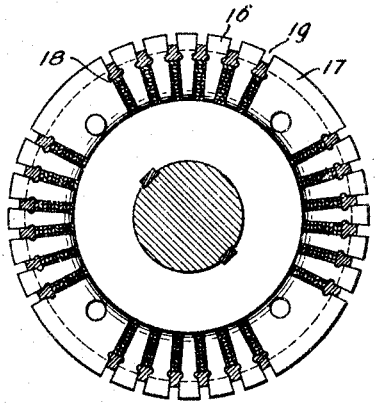
Figure 3:
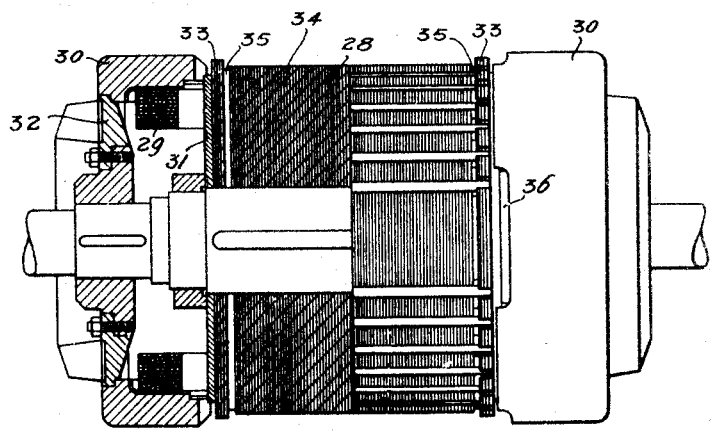

Figure 1 is a vertical sectional elevation of a turbo-alternator constructed in accordance with my invention, the alternator having a cylindrical rotary field core which in this case is built up of a number of rigid disks and having field coils which project beyond the core and are surrounded by coil retaining rings. Fig. 2 is a transverse section taken through the rotor or rotary field member, the section being taken substantially along the line 2—2 of Fig. 1 looking in the direction indicated by the arrows. Fig. 3 is a view half in section and half in elevation, of a rotary field member of a high speed alternator constructed in accordance with my invention and having its core built up of sheet metal punchings or laminæ.

Referring now to the figures of the drawings, 10 represents a housing or casing which incloses the machine and which is provided to deaden the noise incident to high speeds of rotation and to permit proper ventilation. This housing includes a central ribbed portion which supports an annular laminated stator or armature core 11 which is provided with the usual armature winding 12. Extending through the ends of the housing is a shaft 13 on which the rotor or rotary field magnet is secured. This rotor is provided with a cylindrical core 14, the construction of which may be varied to a considerable degree and will depend upon the size and the speed to which the rotor is to be subjected. As shown in Fig. 1 the core is built up of a definite number of rigid circular forged steel disks the two outer or end disks being designated 14$^a$ and the disks between the end disks being designated 14$^b$. The disks are mounted on the shaft in direct engagement with one another for a purpose to be explained later, and are held in position by clamping nuts 15. The core is provided, as shown in Fig. 2, with radial slots forming teeth 16 and poles 17 (a four-pole machine being shown in this instance) and these slots receive the sides of field coils 18 which are preferably formed of edgewise wound strap copper, the coils being arranged concentrically about each pole and being retained in the slots by wedges 19 which preferably extend entirely across the core. The coils are provided with end portions 20 which project beyond the core and are held in position against displacement by centrifugal force by coil retaining means which consist in this case of rigid rings 21 formed of some material such as steel possessing high tensile strength, these rings engaging at their inner ends and being partially supported by the two end or outer disks 14$^a$ and at their outer ends engaging rings 22 which may be formed of bronze and are supported by the shaft.

As is shown clearly in Fig. 1 the end disks 14$^a$ are greater in diameter than the intermediate disks 14$^b$, the latter in this case being all of uniform diameter. Furthermore the effective cross sectional areas or widths of at least the outer portions of the end disks 14$^a$ are made less than the cross sectional areas or widths of the disks 14$^b$ and this I accomplish in this case by thinning or removing portions of the inner sides of the end disks so as to form circumferential air gaps 23 of considerable reluctance, which air gaps separate the outer portions of the end disks from the corresponding portions of the adjacent disks 14$^b$ and prevent to a large extent the passage of flux between disks 14$^a$ and the adjacent disks 14$^b$. If desired, to decrease still further the cross sectional areas of the end disks, axial openings 24 may be provided in the pole portions of said disks. These openings also permit a circulation of air around the end portions of the coils. The diameter of the end disks is preferably such that when the machine is in operation the density of the flux passing between the cores of the rotary and stationary members is practically uniform from one end of the machine to the other, and the diameter and cross sectional areas of these end disks are made such that the flux passing through the end disks and particularly the flux passing between these disks and the stator core is sufficient to saturate the former. The flux which would pass from pole to pole through the end rings is therefore choked back, so to speak. As was stated before and as shown in the drawings the intermediate disks 14$^b$ are in direct engagement with one another, and therefore there may be an equalization of the flux densities in these disks. The air gaps 23, however, prevent to a large extent the passage of flux between the outer portions of the disks 14$^b$ and the corresponding portions of the end disks 14$^a$. To decrease still further the leakage of flux through the rings, I make the area of the bearing surfaces of the rings upon the end disks as small as possible, consistent with strength and rigidity of construction, and for this purpose the outer portions of the end disks 14$^a$ are provided with annular recesses or notches 25 forming annular shoulders. The inner portions of the rings are also provided with annular recesses, and these last named recesses receive the outer portions only of the shoulders formed by the recesses in the end disks, the inner edges or faces of the rings being separated by narrow slots or air gaps 26 from the vertical faces of the annular recesses 25. Furthermore the portions of the end rings opposite the poles are cut away or notched as shown at 27 so as to increase still further the reluctances of the magnetic paths from pole to pole through the rings.

In Fig. 3 I have shown a rotor having its core 28 built up of laminæ, but which like the rotor first described, is constructed so that a substantially uniform flux density will be obtained from one end of the machine to the other and so that magnetic leakage through the end rings will be greatly diminished. The core is provided with slots which receive the side portions of the field coils, the latter having portions 29 which project beyond the ends of the core and are inclosed and retained in position by end rings 30. In this instance the rotor has at the ends of the core, plates or disks 31 which are preferably formed of non-magnetic material, and the rings 30, instead of engaging directly the ends of the core, engage the peripheries of these plates or disks 31. As in the construction first described, the outer ends of the rings 30 engage rings 32 which are supported by the shaft. These disks 31, which are engaged by the inner ends of the rings 30, diminish to some extent the leakage which would take place through the end rings, but such disks cannot be employed in all machines, particularly in large machines, wherein the peripheral speeds of the rotors are extremely high, and in other machines having rotors which are so designed and constructed that disks of non-magnetic material cannot be conveniently or safely secured to the ends of the rotor cores. It will be seen that the core 28 is provided at its ends with sections 33 which are of greater diameter than the main or intermediate portion 34 and are separated from said intermediate portion by circumferential air gaps or spaces 35, these air gaps being formed by separating or spacing part of the laminæ at the ends of the core from the main body of the latter. The intermediate portion 34, as is shown in the drawing, is not provided with air gaps or circumferential ventilating spaces usually provided in machines of this type and inasmuch as all the laminæ of this portion of the core are in direct engagement with one another there may be an equalization of the flux density between different parts of this portion of the core. The gaps 35 however prevent to a large extent the passage of flux between the end sections or portions 33 and the intermediate portion 34. The diameter and the axial widths of the end sections 33 are made such that when the machine is in operation the density of the flux passing between the cores of the rotary and stationary members will be substantially uniform from one end of the machine to the other or will be the same at the ends of the machine as at any point between the ends and at the same time these end sections will be highly saturated. As in the construction first described, the rings 30 are provided opposite the poles of the core with notches or recessed portions 36 which increase the reluctances of the magnetic paths from pole to pole through the rings. Therefore in the rotor shown in Fig. 3, the magnetic leakage through the end rings will be very small.

I do not desire to be confined to the exact details shown but aim in my claims to cover all modifications which do not involve a departure from the spirit and scope of my invention.

What I claim as new and desire to secure by Letters Patent is:—

1. In a dynamo-electric machine, a rotary member having a core, the end portions of which are of greater diameter than the middle portion thereof and are thicker near the center than near the periphery.

2. In a dynamo-electric machine, a rotary member having a core, the end portions of which are separated at the periphery from the main or intermediate portion of the core and are thinner at the periphery than near the center.

3. In a dynamo-electric machine, a rotary member having a core, the end portions of which are of greater diameter than the intermediate portion, are contiguous with the latter near the center, and are separated therefrom near the periphery by gaps or spaces of high reluctance.

4. In a dynamo-electric machine, a rotary member having a core provided at the ends with portions which are of greater diameter than the intermediate portion of the core, are separated therefrom near the periphery by spaces or gaps of high reluctance, and are thicker near the center than near the periphery.

5. In a dynamo-electric machine, rotary and stationary members having cores which are separated by an air gap or clearance space, the clearance between the ends of the cores being less than the clearance between the middle portions of the cores, and the rotary core having end portions which are thicker near the center than near the periphery.

6. In a dynamo-electric machine, rotary and stationary members having cores which are separated by an air gap or clearance space, the ends of the rotary core being greater in diameter than the intermediate portion thereof so that the reluctance of the air gap is less at the ends of the machine than intermediate the ends, and said end portions of the rotary core being thinner near the periphery than near the center.

7. In a dynamo-electric machine, rotary and stationary members having cores which are separated by an air gap or clearance space, the ends of the rotary core being greater in diameter than the intermediate portion thereof so that the reluctance of the air gap is less at the ends of the machine than intermediate the ends, and said end portions of the rotary core being separated at the periphery from the intermediate portion thereof by air gaps.

8. A rotor for a dynamo-electric machine comprising a core and coils which project beyond the ends of the core, means formed of magnetic material for retaining the projecting portions of the coils in position, the portions of the core adjacent said coil-retaining means being of greater diameter than the intermediate portion of the core and being separated therefrom near the periphery by gaps of considerable reluctance.

9. In a rotor for a dynamo-electric machine, a cylindrical core, coils carried by said core and projecting beyond the ends thereof, rings of magnetic material surrounding said projecting portions of the coils, the portions of the core adjacent the rings being of greater diameter than the intermediate portion of the core and being separated therefrom at the periphery by spaces of high reluctance.

10. A rotor for a dynamo-electric machine comprising a cylindrical core having coils which project beyond the ends thereof, rings of magnetic material surrounding the projecting portions of the coils, said core having near the ends thereof circumferential gaps, the portions of the core beyond the gaps being of greater diameter than the portion between the gaps.

11. In a rotor for a dynamo-electric machine, a cylindrical core having coils which project beyond the ends thereof, rings of magnetic material surrounding the projecting portions of the coils and engaging the ends of the core, said core having near the ends circumferential air gaps, the portions of the core beyond the air gaps being of greater diameter than the portion between the gaps and having cross sections such that said portions are saturated when the core is magnetized.

12. A rotor for a dynamo-electric machine comprising a cylindrical core formed of a definite number of rigid disks, field coils carried by said core and projecting axially beyond the ends thereof, end rings of magnetic material surrounding the projecting portions of the coils, said end disks being of greater diameter than the intermediate disks and having portions separated therefrom by spaces or gaps of high reluctance.

13. In a dynamo-electric machine, a rotary field member comprising a cylindrical core formed of a plurality of disks arranged side by side, field coils carried by the core and projecting axially beyond the ends thereof, rings of magnetic material surrounding the projecting portions of the coils and engaging the two end disks, said end disks being of greater diameter than the intermediate disks and the outer portions of said end disks being of less thickness than the corresponding portions of the intermediate disks.

14. In a dynamo-electric machine, a rotary field member comprising a plurality of disks, the two outer or end disks being of greater diameter than the intermediate disks, and the intermediate disks being of uniform diameter and being in engagement with one another, and said end disks having portions removed from their inner sides forming annular air gaps between said end disks and the adjacent disks, and field coils carried by said core.

15. In a dynamo-electric machine, a rotary cylindrical field core having coils which project axially beyond the ends thereof, rings of magnetic material surrounding the projecting portions of the coils and engaging the ends of the core, said rings having recesses or notches opposite the poles of the core, portions of the core adjacent the rings being of greater diameter than portions remote from the rings.

16. In a dynamo-electric machine, a rotary cylindrical field core composed of a plurality of disks having slots, coils located in said slots and projecting axially beyond the ends of the core, rings of magnetic material surrounding the projecting portions of the coils and engaging the end disks, said rings having recesses or notches opposite the field poles, and said end disks being of greater diameter than the remaining disks and being separated from the latter near the periphery by annular spaces of high reluctance.

17. In a dynamo-electric machine, a rotary cylindrical core consisting of rigid steel disks arranged side by side with their adjacent faces in engagement, the two outer or end disks being of greater diameter than the remaining disks and portions of the end disks and the disks adjacent thereto being separated near the periphery by annular air gaps, said core having groups of radial slots forming teeth and field poles, coils located in the slots and projecting axially beyond the ends of the core, rings of magnetic material surrounding the projecting portions of the coils and engaging the end disks, said rings having recesses or notches opposite the field poles.

18. In a dynamo-electric machine, a rotary cylindrical field core having coils which project axially beyond the ends thereof, and rings of magnetic material surrounding the projecting portions of the coils and engaging the ends of the core, said rings having recesses or notches opposite the poles of the core.

19. In a dynamo-electric machine, rotary and stationary members having cores which are separated by an air gap or clearance space, the core of the rotary member having end portions which are separated at the periphery from the middle portion by air gaps, the clearance space between the end portions of the cores of the rotary and stationary members being less than that between the middle portions of said cores.

20. In a dynamo-electric machine, a rotary member having a core built up of rigid disks, said disks being all in engagement with one another near their centers, and the end disks at their peripheries being separated from the adjacent disks by air spaces.

21. In a dynamo-electric machine, a rotary member having a core built up of a number of disks all in engagement with one another, the end disks being cut away at the periphery on the sides toward the adjacent disks.

22. In a dynamo-electric machine, a rotary member having a core built up of a number of disks all in engagement with one another, the end disks being cut away at the periphery on the sides toward the adjacent disks and being larger in diameter than the remaining disks.

23. In a dynamo-electric machine, a rotary member having a core of the cylindrical type provided with two peripheral grooves near its two ends respectively, the section of the core which is between the two grooves being of smaller diameter than the two sections outside said grooves.

Milwaukee, Wis., May 3, 1909.

In testimony whereof I affix my signature, in the presence of two witnesses.

CARL J. FECHHEIMER.

Witnesses:
R. B. WILLIAMSON,
CHAS. L. BYRON.